US012454968B1

(12) United States Patent
Larew et al.

(10) Patent No.: US 12,454,968 B1
(45) Date of Patent: Oct. 28, 2025

(54) SECURED GLAND FOR FLUID-POWERED CYLINDER

(71) Applicant: Swanson Industries, Inc., Morgantown, WV (US)

(72) Inventors: Christopher Larew, Newburg, WV (US); Naveen Koka, Oakdale, PA (US)

(*) Notice: Subject to any disclaimer, the term of this patent is extended or adjusted under 35 U.S.C. 154(b) by 0 days.

(21) Appl. No.: 18/774,901

(22) Filed: Jul. 16, 2024

(51) Int. Cl.
*F15B 15/14* (2006.01)

(52) U.S. Cl.
CPC ................................ *F15B 15/1461* (2013.01)

(58) Field of Classification Search
CPC ... F15B 15/16; F15B 15/1438; F15B 15/1461
See application file for complete search history.

(56) References Cited

U.S. PATENT DOCUMENTS

| | | | | | |
|---|---|---|---|---|---|
| 1,174,788 | A | * | 3/1916 | Winn | F15B 15/16 114/90 |
| 2,364,741 | A | * | 12/1944 | Merchant | F15B 15/16 92/52 |
| 2,832,650 | A | * | 4/1958 | Park | F16J 15/18 92/53 |
| 5,238,330 | A | * | 8/1993 | Plevak | E21D 23/0436 405/295 |
| 2017/0108016 | A1 | * | 4/2017 | Knoblich | F15B 15/1438 |

FOREIGN PATENT DOCUMENTS

| | | | | | |
|---|---|---|---|---|---|
| CA | 2306073 | A1 | * | 10/2001 | B66F 3/28 |
| CN | 201779252 | U | | 3/2011 | |
| CN | 203702964 | U | * | 7/2014 | |
| CN | 106151156 | A | * | 11/2016 | |
| CN | 206749132 | U | * | 12/2017 | |

* cited by examiner

*Primary Examiner* — Abiy Teka

(74) *Attorney, Agent, or Firm* — Richard W. James

(57) ABSTRACT

A hydraulic cylinder apparatus. The apparatus includes a hydraulic cylinder barrel, a gland screwed into and bolted onto the hydraulic cylinder barrel, and a piston extending through the gland into the hydraulic cylinder barrel.

20 Claims, 11 Drawing Sheets

SECURED GLAND FOR FLUID-POWERED CYLINDER

FIELD OF THE INVENTION

This invention is related to hydraulic cylinders, and more particularly to an apparatus and method for minimizing leakage from to a hydraulic cylinder.

BACKGROUND OF THE INVENTION

Pneumatic and hydraulic fluid driven cylinders are cylinders with a piston or a piston rod that are moved by fluid—pneumatic or hydraulic commonly—that are used in many applications, from heavy machinery and vehicles to industrial, manufacturing, mining, and agricultural applications. Moreover, pneumatic and hydraulic cylinders are used to move loads of all types.

A cylinder generally includes a cylindrical block of material having a circular bore in it. A piston is disposed in the circular bore of the cylinder. A piston rod extends from the piston, through a cylinder base and out of the cylinder through a rod opening and be connected to another mechanism.

Fluid powered hydraulic and pneumatic powered cylinders can be configured in many ways: (1) to push a load attached to a rod extending from the piston through a portion of the cylinder, (2) to pull a load attached to a rod extending from the piston through a portion of the cylinder, or (3) to hold a load attached to a rod extending from the piston through a portion of the cylinder in place, for example.

Thus, an arm of a machine may, for example, be raised by applying hydraulic pressure to a first side of a piston in a cylinder, the piston having a rod that is attached to the arm of the machine, and the same arm may be lowered by reducing hydraulic pressure on the first side of the piston in the cylinder. That arm may alternatively be held in a position by maintaining pressure applied to the first and second sides of the piston in the cylinder once the arm has reached its desired position.

Hydraulic and pneumatic cylinders may be used in many applications, for example, in heavy machinery where one or more cylinders are used to move or hold in position portions of the machinery, such as mining equipment, shovels and buckets, or to hold a piece of machinery in position, such as a retractable bracing arm.

One type of cylinder may be coupled to a load, such as a mine shield stepping apparatus or a damper, and may be extended or retracted, and in turn move the load. Another type of cylinder may be to hold an apparatus such as a mine shield in a position continuously for a long period of time. For example, a cylinder may be used to press a mine shield toward a roof of a mine by applying pneumatic or hydraulic pressure in a cylinder to a piston.

In an application in which a cylinder is cycled from extended to retracted and various points of extension, the second side of the piston may be biased, for example, to move the piston toward the first side of the cylinder, by a spring or other biasing device. Thus, in that embodiment, fluid pressure is applied to the first side of the piston in the cylinder to push the piston rod to extend a piston rod out or further out from the second side of the cylinder and fluid pressure power is simply removed from the first side of the piston in the cylinder to allow the bias to actuate the piston rod back into the second side of the cylinder.

Another type of cylinder, often referred to as a double-acting cylinder, uses fluid power on each side of the cylinder.

Fluid applied to the first side of the piston in the cylinder tends to move the piston away from the first side of the cylinder toward the second side of the cylinder and fluid applied to the second side of the piston tends to move the piston away from the second side of the cylinder toward the first side of the cylinder.

Yet another piston may be coupled to a load and pressurized fluid may be applied to both sides of the piston in the cylinder to maintain the load in a small range of positions by applying the pressurized fluid to resist movement toward the first side of the cylinder or the second side of the cylinder. In one such embodiment, one or more cylinders are used as tensioners for an ocean situated drilling rig or other machine. Tensioner cylinders can have high pressure fluid applied at each end, thereby applying force to both sides of the piston to maintain the piston near a desired position. The tensioner cylinder can furthermore have an inlet on one or both sides of the piston and the inlets can be connected to a pressurized fluid, generally proximate to a different source for each end, though both ends may ultimately use the same fluid source. The tensioner piston rod may then be attached to a fixed location such that the tensioner may resist undulation, for example rising and falling of a floating drilling rig caused by waves.

Thus, hydraulic and pneumatic cylinders can push against a load, pull against a load, or both push and pull against a load.

There may be a need for improved apparatuses and methods for preventing or minimizing fluid leakage from a cylinder.

There may be a need for apparatuses and methods to minimize ambient conditions from damaging a cylinder.

There may be a need for apparatuses and methods for rugged uses in mining applications where stones and earth may fall on the cylinder and the cylinder may be struck regularly and repeatedly by workers and conditions that exist in a punishing, severe mine setting.

During longwall mining, a drum or other shear advances along a wall of coal, shearing off a layer of coal for collection. Mine roof supports, such as shield canopy mine roof support systems, contact the mine roof during the shearing operation to prevent roof collapse and are operated by hydraulic cylinders that are frequently damaged and require additional protection to facilitate continued operation.

Once shearing has occurred on a section of the longwall, the shield canopy is moved forward toward the coal seam using hydraulic cylinders to position it for the next shearing cycle. Furthermore, the mining shield may advance by way of a base lift operated by hydraulic cylinders pressing against a relay bar to lift the shield, while another hydraulic cylinder that moves the shield toward the seam being mined. The base lift is, therefore, a heavy piece of equipment that is performing a heavy, demanding, important function and doing so in a difficult, hazardous, underground environment. Because the base lift operates in such a harsh setting, it must hold-up well and be maintained regularly.

Accordingly, sturdy, robust hydraulic cylinders for efficiently operating shield including shield canopies are needed and those apparatuses should be amenable to fast, easy maintenance to keep the longwall mining process going efficiently and an apparatus that meets those requirements is needed.

Thus, there remains a need for a mining shield hydraulic cylinder that is built for rugged conditions and is readily amenable to maintenance.

BRIEF DESCRIPTION OF THE DRAWINGS

The accompanying drawings, wherein like reference numerals are employed to designate like components, are included to provide a further understanding of cylinder apparatuses and methods, are incorporated in and constitute a part of this specification, and show embodiments of those apparatuses and methods that together with the description serve to explain those apparatuses and methods.

Various other objects, features and advantages of the invention will be readily apparent according to the following description exemplified by the drawings, which are shown by way of example only, wherein.

SUMMARY OF THE INVENTION

Figure 1:
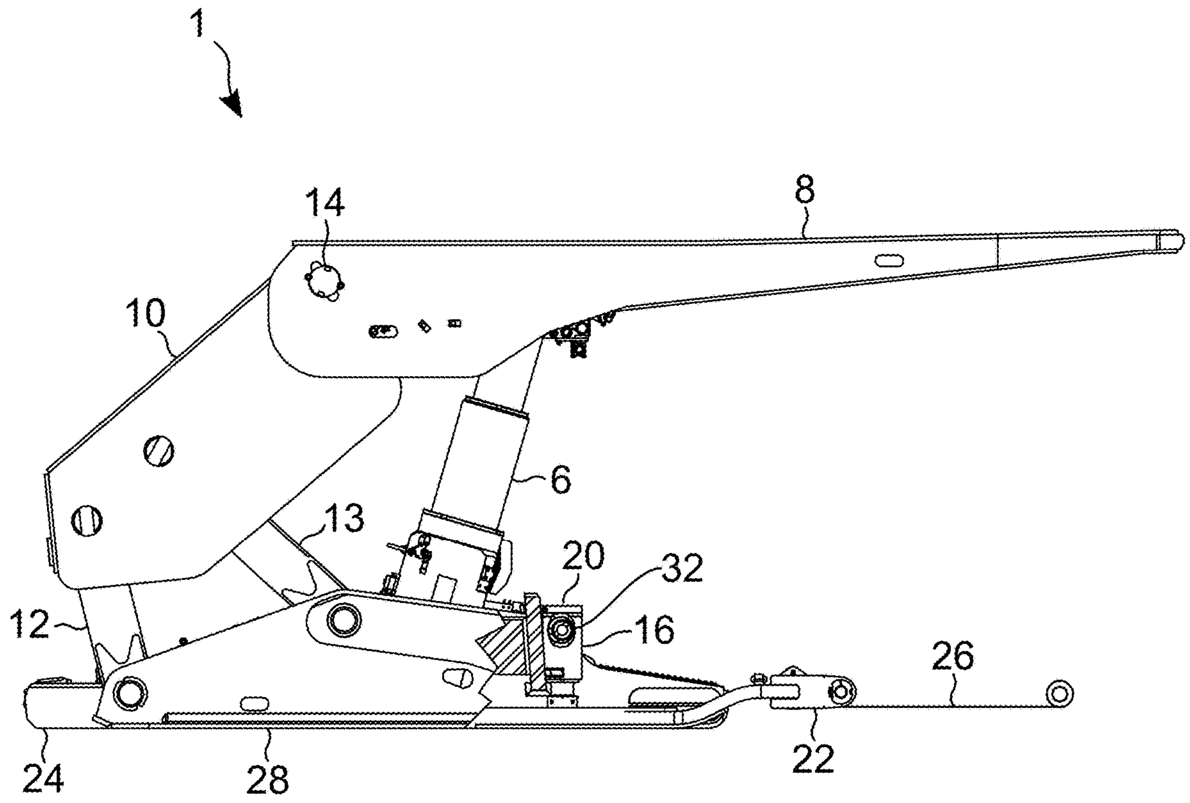
FIG. 1 illustrates a side view of an embodiment of a longwall mining shield in accordance with certain shield embodiments.

In an embodiment, a hydraulic cylinder with a secured sealing gland is provided. The hydraulic cylinder includes a hydraulic cylinder barrel having a first end, a second end, a cross-section, an outer surface, and an axial inner surface forming an inner chamber. The axial inner surface of the hydraulic cylinder is threaded with square threads at its second end. The hydraulic cylinder also includes a barrel sealing gland having an axial body with an outer surface, a lip that extends axially out from the body, and an orifice extending axially through the center of the axial body of the barrel sealing gland forming an inner surface of the barrel sealing gland. The barrel sealing gland has square threads on its outer surface and the barrel sealing gland is screwed into the square threads of the hydraulic cylinder barrel using the barrel sealing gland square threads. The hydraulic cylinder further includes a plurality of bolts extending through the barrel sealing gland and threaded into the hydraulic cylinder barrel. In addition, the hydraulic cylinder includes a first piston disposed through the axial orifice extending through the barrel sealing gland and extending into the hydraulic cylinder barrel, the first piston having a first end, a second end, an outer surface, and an axial inner surface, and forming a first pressurizable chamber defined by the inner surface of the hydraulic cylinder barrel, the first piston extending through the barrel sealing gland into the hydraulic cylinder barrel, and having an axial inner surface, the axial inner surface threaded with square threads at the second end. The hydraulic cylinder further includes a first piston sealing gland having an axial body with an outer surface, a lip that extends axially out from the body, and an orifice extending axially through the center of the first piston sealing gland and forming an inner surface of the first piston sealing gland. The first piston sealing gland has square threads on the outer surface of the first piston sealing gland and the first piston sealing gland is screwed into the square threads of the first piston. In addition, the hydraulic cylinder includes a retract port extending through the hydraulic cylinder barrel and in fluid communication with a pressurized fluid source. The hydraulic cylinder, additionally, includes a second piston disposed through the axial hole extending through the first piston sealing gland.

In another embodiment a longwall mining shield is provided. The longwall mining shield includes two parallel pontoons, two hydraulic cylinders, each having a barrel and a piston, a first end of each hydraulic cylinder barrel attached to one of the two parallel pontoons, and a canopy attached to a second end of the two hydraulic cylinder pistons. Each of the hydraulic cylinders includes a hydraulic cylinder barrel having a first end, a second end, a cross-section, an outer surface, and an axial inner surface, the axial inner surface forming an inner chamber with a threaded axial inner surface at the second end, a barrel sealing gland having an axial body with an outer surface, a lip that extends axially out from the body, and an orifice extending axially through the center of the axial body of the barrel sealing gland forming an inner surface of the barrel sealing gland, the barrel sealing gland having threads on the outer surface of the barrel sealing gland body, the barrel sealing gland threaded into the threads of the hydraulic cylinder barrel with the barrel sealing gland threads. A plurality of bolts extend through the barrel sealing gland lip and are threaded into the hydraulic cylinder barrel. A first piston is disposed through the barrel sealing gland axial orifice and extends into the hydraulic cylinder barrel, the first piston having a first end, a second end, an outer surface, and an axial inner surface. A pressurizable chamber is defined by the inner surface of the hydraulic cylinder barrel and the first piston extending through the barrel sealing gland into the hydraulic cylinder barrel. A retract port is disposed through the hydraulic cylinder barrel and is for fluid communication with a pressurized fluid source.

In another embodiment, a method of installing a gland in a component 410, 412, 451 of a pressurized fluid cylinder is disclosed. In that method, a gland is screwed into a hydraulic cylinder barrel, the gland is then bolted to the hydraulic cylinder. In a two-stage cylinder embodiment a second piston is slid into the first piston gland such that the first piston extends into the hydraulic cylinder barrel. A second piston gland may furthermore be screwed into the first piston, the second gland may be bolted to the first piston, and a second piston may be slid or otherwise placed through the first piston gland and into the first piston to create a three-stage telescopic cylinder.

Other embodiments, which may include one or more parts of the aforementioned apparatuses and methods or other parts, are also contemplated, and may thus have a broader or different scope than the aforementioned apparatuses and methods. Thus, the embodiments in this Summary of the Invention are mere examples, and are not intended to limit or define the scope of the invention or claims.

DETAILED DESCRIPTION

Reference will now be made to embodiments of a hydraulic cylinder apparatuses and methods, examples of which are shown in the accompanying drawings. Details, features, and advantages of base plate apparatuses and methods will become further apparent in the following detailed description of embodiments thereof.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification do not necessarily all refer to the same embodiment. References to "or" are furthermore intended as inclusive, so "or" may indicate one or another of the ored terms or more than one ored term.

Figure 2:
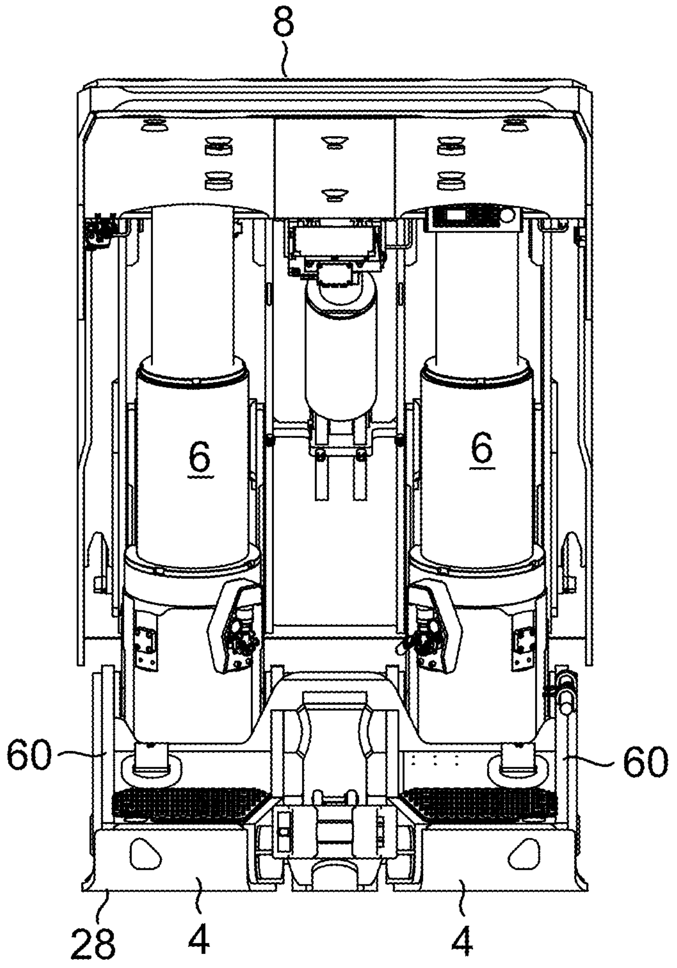
FIG. 2 illustrates a front view of the longwall mining shield embodiment illustrated in FIG. 1.

FIG. 1 illustrates a side view of an embodiment of a longwall mining shield 1 and FIG. 2 is a front view of the longwall mining shield 1 embodiment illustrated in FIG. 1. That embodiment of the longwall mining shield 1 includes two parallel pontoons 4 that support a pair of leg cylinders 6 that, in turn, support the canopy 8. A caving back 10 is connected to two pontoons 4 by way of front and rear links 12 and 13 and is connected to the canopy 8 by a pin 14. The height of the canopy may be adjusted by hydraulically operating the leg cylinders 6, embodiments of which are described in greater detail herein.

An advancing mechanism 16, which may include at least one base lift 20, a relay bar 22 and at least one ram cylinder 24 is depicted in the embodiment illustrated. The advancing mechanism 16 is also attached to the pontoons 4 to move the shield 1 toward the longwall face. The shield 1 of this embodiment is attached to a panline 26 through the relay bar 22 and the panline 26 includes a conveyor and a chain that move sheared coal away from the longwall face. After a depth of coal has been harvested from the longwall, the ram cylinder 24 extends the relay bar 22 out, pushing the panline 26 toward the new longwall face when the shield 1 is set against the mine roof. To advance the shield 1, the shield 1 canopy 8 is lowered and at least one base lift 20 is hydraulically activated, extending the base lift 20 to press against the relay bar 22 between the pontoons 4, thereby lifting the front of a shield 1 base 28. Once the front of the shield 1 base 28 is lifted, the at least one ram cylinder 24 is retracted pulling the shield 1 toward the longwall face. Once the shield 1 has been moved toward the longwall face, the base lift 20 is deactivated, thereby reducing the length of the base lift 20 and allowing the pontoons 4 to rest on the surface below them. The base lift 20 may then gravitationally swing toward a vertical position, rotating on one or more shafts 32 pivotally connecting the base lift 20 to the shield base 28 so the base lift 20 is positioned for activation for the next advance of the shield 1.

Figure 3:
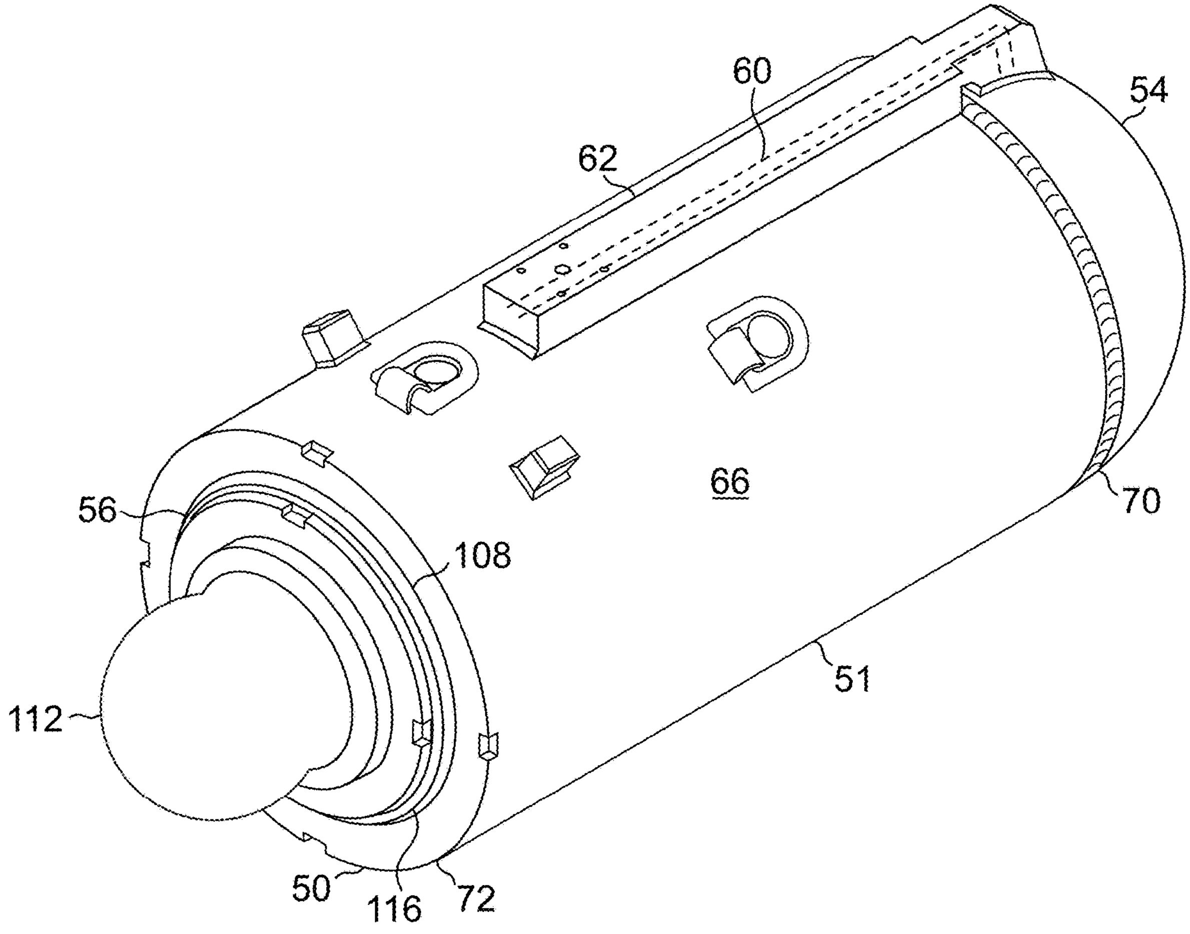
FIG. 3 illustrates a perspective view of a fluid driven cylinder of the present invention.

FIG. 3 illustrates a perspective view of a fluid driven cylinder 50 of the present invention. The fluid driven cylinder 50 may be hydraulically operated or pneumatically operated, and any fluid used to poser cylinders may be used with the fluid driven cylinder 50. As may be seen in FIG. 3, the fluid driven cylinder 50 may include a fluid driven cylinder barrel 51 having a housing 53 with an internal surface 52 (illustrated in FIG. 4) and an external surface 66 and a hydraulic fluid channel 60, which may be formed in an extended bar 62 attached to or formed on an external surface 66 of the fluid driven cylinder barrel 51.

Figure 4:
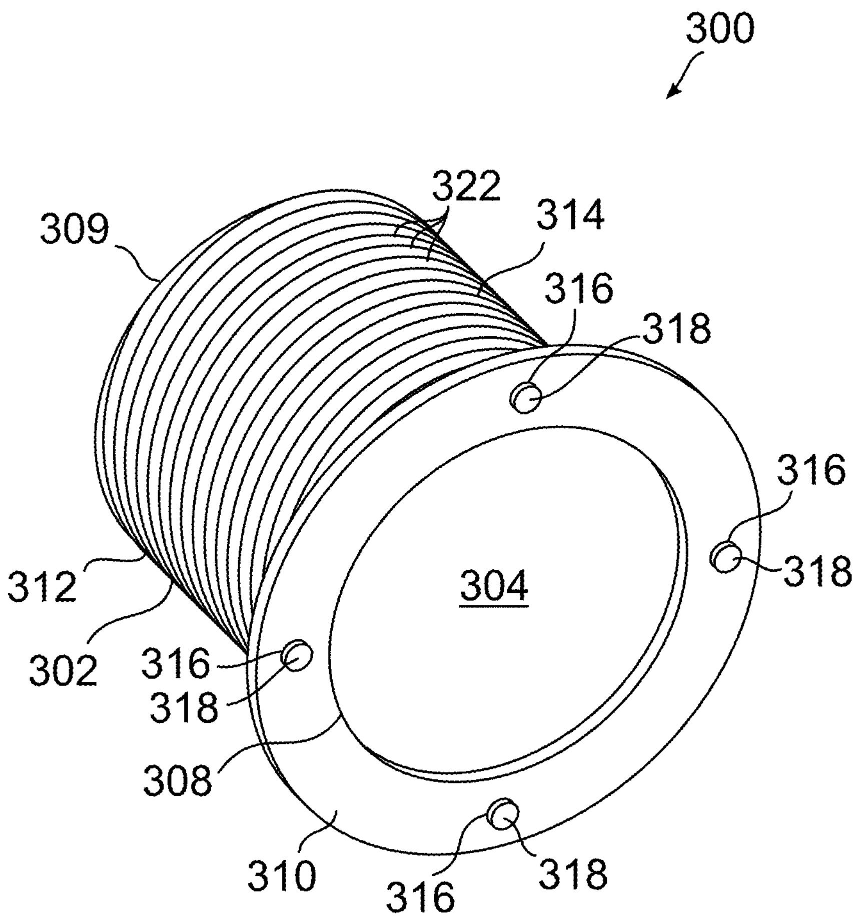
FIG. 4 illustrates an embodiment of a fluid driven cylinder gland of the present invention.

FIG. 4 depicts a fluid driven cylinder gland 300. The gland 300 includes a cylindrical body 302, an orifice 304 disposed axially though the gland body 302, and a lip 310 extending radially outward from a first end 308 of the cylinder gland 300.

The gland orifice 304 may be cylindrical and extend through the length of the cylindrical body 302 of the gland 300 such that the cylinder gland axial body 302 has a wall 312 with a consistent thickness. An external surface 314 of the cylinder gland wall 312 may be threaded 322 from a second end 309 of the gland body 302. The lip 310 may be formed with the gland body 302 and may include a plurality of bolt holes 316. Bolts 318 may be placed through the gland bolt holes 316 and aligned with threaded bolt holes 320 in the apparatus to which the gland 300 is to be attached 410, 412, 451 or threaded bolt holes 320 aligned with the gland 300 bolt holes 316 may be formed in the apparats to which the gland 300 is to be attached 410, 412, 451. The lip 310 may bolt to an end 132, 134, 308, 309 of the apparats to which the gland 300 is to be attached 410, 412, 451. The bolts 318 may be placed through the gland 300 bolt holes 316 and attached to the apparatus to which the gland 300 is to be attached 410, 412, 451, thereby further securing the gland 300 to the apparatus to which the gland 300 is to be attached 410, 412, 451. It is thought that a gland 300 screwed or threaded into a cylinder barrel 451 or a piston 410, 412 may work its way out of or unthread from the barrel or piston 410, 412, 451 due to vibrations or other conditions present in a mining or other operation in which the hydraulic cylinder 50 is utilized. Accordingly, it is thought that by bolting the gland 300 to the apparatus to which the gland 300 is to be attached 410, 412, 451, the gland will be maintained in place in relation to the apparatus to which the gland 300 is to be attached 410, 412, 451.

Any desired number of bolt holes 316 may be provided in the gland 300 and the same or a greater number of threaded bolt holes 320 may be provided in the apparatus to which the gland is to be attached 410, 412, 451. Thus, for example, in one embodiment four gland bolt holes 316 are provided in a gland 300 and eight threaded bolt holes 320 are provided in the apparatus to which the gland is to be attached 410, 412, 451 such that the gland bolt holes 320 can be aligned with the threaded bolt holes 320 in eight different positions in 360 degrees of gland 300 rotation when threading the gland 300 threads 322 into the cylinder barrel 451 or piston 410, 412 in which the gland 300 is to be situated.

The gland 300 threads 322 may be square toothed threads 68 that compliment and mesh with square toothed threads 68 on the apparatus to which the gland 300 is to be attached 410, 412, 451. Square toothed threads 68 have been found to be a less difficult style to unthread or "break loose" than standard angled threads after being exposed to the heavy wear that can exist in a subterranean mine or other operations where significant dirt and other corrosive or invasive elements may be encountered. Standard angled threads have been found to be more likely than square toothed threads 68 to become locked together through moisture, dirt, and rock after heavy use in a harsh mining atmosphere.

The gland 300 orifice 304 may be configured to accept a piston 410, 412 or configured as a rod opening 108. A rod opening 108 may alternatively be a hole bored in the base 56 that is coaxial with the cylindrical fluid driven cylinder barrel 51, a piston 110 (illustrated in FIG. 3) disposed in a bore 116 (illustrated in FIG. 3) in the fluid driven cylinder barrel 51, and a rod 112 extending from the piston 110 through the rod opening 108 in the base or gland 56 of the fluid driven cylinder 50. A rod opening 108 may house a seal 116 placed therein that seals against leakage through the rod opening 108. Seals 116 and glands 56, 300 may eliminate or reduce flow of fluids or other materials from a chamber 120, 122, 420, 422 of the cylinder 50 leaking out of the chamber 120, 122, 420, 422 of the cylinder 50 or against fluids, gasses, or solids making their way into the cylinder 50. The seal 116 may seal against the cylinder 50 as well as against the piston 110, 410, 412, or piston rod 112. A variety of seals 116 and glands 86, 300 may be used together or independent of one another, and may include, for example, a primary seal 116, a secondary seal 116, one or more wear bands, a wiper, a scraper, and a static seal 116.

Figure 5:
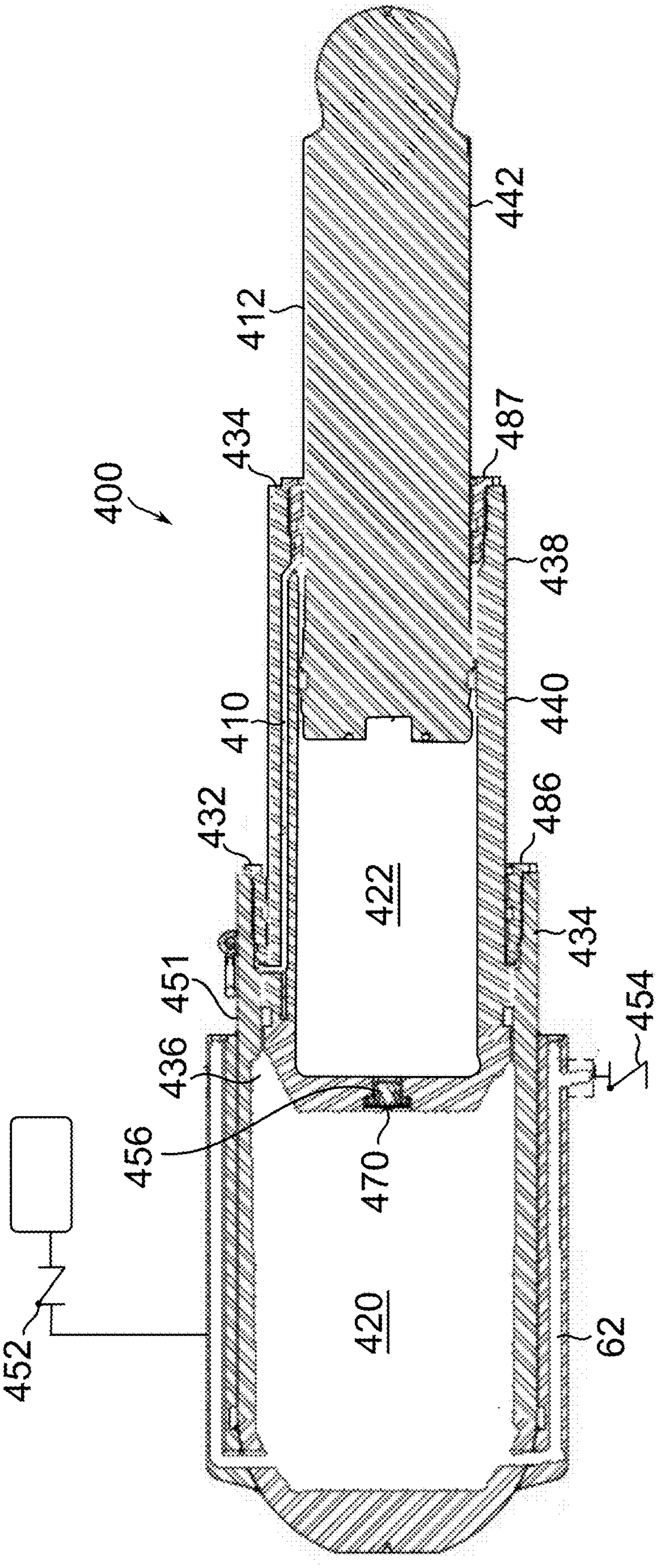
FIG. 5 illustrates an embodiment of a two-stage telescopic hydraulic cylinder of the present invention.
Figure 6:
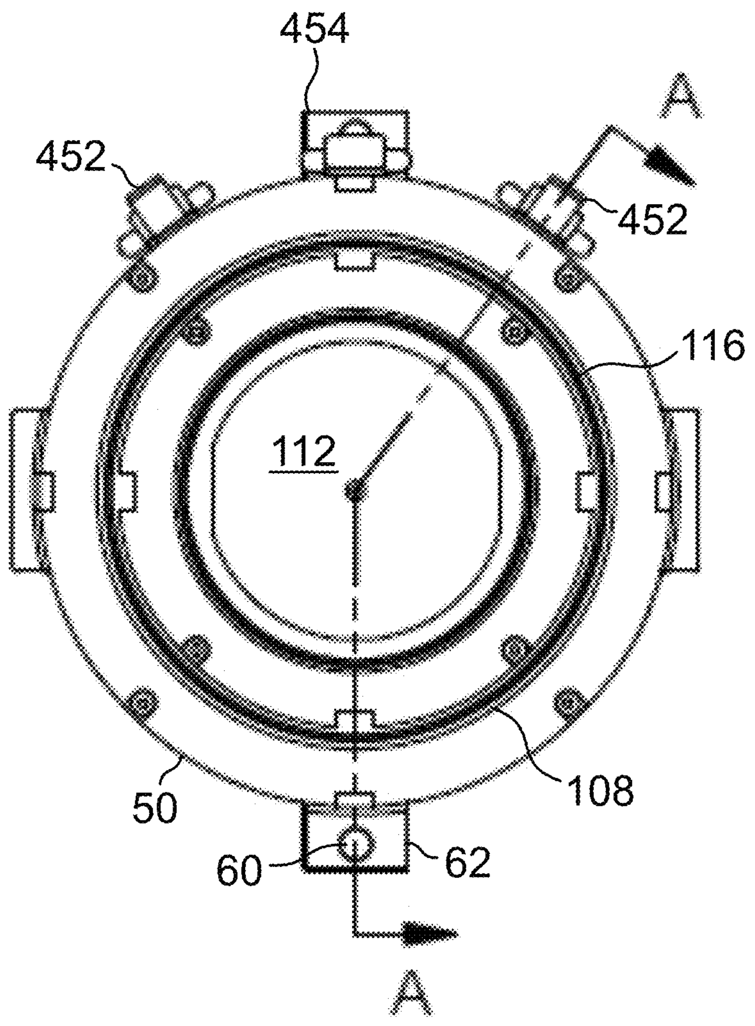
FIG. 6 illustrates a second end view of the hydraulic cylinder depicted in FIG. 5.

For example, in the embodiment illustrated in FIGS. 4, 5, and 6, the first gland 486 is threaded into the second end 434 of the cylinder barrel 451 and the first stage piston 410 is tightly, but slidably, fit through the orifice 304 in the first gland 486. A second gland 487 is threaded into the second end 434 of the first stage piston 410 and the second stage piston 412 is tightly, but slidable, fit through the orifice 304 in the second gland 487.

The glands 56, 300 or seals 116 may furthermore be elastomer made from nitrile rubber, high-fluorine rubbers, or other materials as desired or as required to prevent or minimize hydraulic fluid, air, or another fluid used to operate the fluid driven cylinder 50 or to meet operating conditions of the fluid driven cylinder 50.

The seal in the embodiments illustrated in FIGS. 3 and 5-7 may be referred to as a gland 86, 300. In the embodiment illustrated in FIGS. 5-7, a first gland 86, 300 is threaded into the hydraulic cylinder barrel 51 and a second gland 87, 300 is threaded into a first stage piston 410. Once the gland 86, 87, 300 is threaded into its receiving apparatus 51, 410, the gland 86, 87 may be bolted to the receiving apparatus 51, 410. Thus, when a gland 86, 87 is positioned as desired, holes in the gland 86, 87 may be aligned with threaded holes 414 the gland 86, 87 may be bolted to the receiving apparatus 51, 410 using a plurality of gland retaining bolts 88.

Fluid driven cylinders 50 are sometimes provided in multiple stages and those cylinders may be referred to as telescopic cylinders. Multiple stage cylinders have numerous applications, including, for example, applications where the retracted length of the cylinder 50 is restricted to a length of less than half of the extended length of the cylinder 50.

FIG. 5 illustrates two-stage telescoping hydraulic cylinder 400 that may be used on a longwall mining shield, such as the shield 1 illustrated in FIG. 1, as a leg 6 or for another purpose. The hydraulic cylinder 400 includes a hydraulic cylinder barrel 451, a first stage piston 410, and a second stage piston 412. The first pressurizable chamber 420 is disposed between an inner surface 452 of the cylinder barrel 451 and the first stage piston 410. A second pressurizable chamber 422 is disposed between the first stage piston 410 and the second stage piston 412. When pressurized hydraulic fluid is applied to the first pressurizable chamber 420, force is applied to the first stage piston 410 that will tend to push the first stage piston 410 out of the cylinder barrel 451 and when pressurized hydraulic fluid is applied to the second pressurizable chamber 422, force is applied to the second stage piston 412, which tends to push the second stage piston 412 out of the first stage piston 410. The telescopic hydraulic cylinder 400 of FIG. 5 is in an extended position as it might be in operation when hydraulic fluid under pressure is applied to the first pressurizable chamber 420 of the hydraulic cylinder barrel 451 and hydraulic fluid under pressure is applied to a second pressurizable chamber 422 in the first stage piston 410. A first gland 486 is attached to a first end 432 of the cylinder barrel 451 and a second gland 487 is attached to a first end 434 of the first stage piston 410. The first gland 486 seals against leakage from the first pressurizable chamber 420 and the second gland seals against leakage from the second pressurizable chamber 422.

The embodiment illustrated in FIG. 5 includes a yield valve 450, a supply check valve 452, and a first stage piston check valve 454. The yield valve 450 may provide relief if pressure in the first pressurizable chamber 420 exceeds a setting of the yield valve 450. The supply check valve 452 may permit flow of hydraulic fluid into the first pressurizable chamber 420 and prevent back flow of hydraulic fluid in the first pressurizable chamber 420 from flowing out of the first pressurizable chamber 420. The first stage piston check valve 454 may permit hydraulic fluid to flow into the second pressurizable chamber 422 from the first pressurizable chamber 420 and prevent hydraulic fluid from flowing out of second pressurizable chamber 422 into the first pressurizable chamber 420.

In this embodiment, pressure applied to the first pressurizable chamber 420 to apply pressure on the first stage piston 410 may flow through the first stage piston check valve 454 into the second pressurizable chamber 422 to apply pressure in the second pressurizable chamber 412 and to the second stage piston 412. It should be noted that, in the embodiment illustrated in FIG. 4, the first stage piston 410 has a smaller diameter 456 than the diameter 458 of the barrel 451. In certain circumstances, fluid pressure in the second pressurizable chamber 422 may be maintained at a higher pressure than fluid pressure in the first pressurizable chamber 420 so that force applied to the second stage piston 412 can be increased to approximately the force applied to the first stage piston 410.

Thus, in one embodiment, pressure may be applied to the second pressurizable chamber 421 through the first stage piston check valve 454 that extends through the first stage piston 410. In an embodiment, that first stage piston check valve 456 is set to allow pressurized fluid to flow from the first pressurizable chamber 420 to the second pressurizable chamber 421 and to restrict pressurized fluid flowing from the second pressurizable chamber 421 to the first pressurizable chamber 420 such that the fluid pressure in the second pressurizable chamber 421 cannot flow from the second pressurizable chamber 412 to the first pressurizable chamber 420 or such that pressure in the second pressurizable chamber must exceed a predetermined force to be permitted to flow back from the second pressurizable chamber 421 into the first pressurizable chamber 420. In that way, for example, the first pressurizable chamber 421 and the second pressurizable chamber 421 may be pressurized with hydraulic fluid flowing into the first pressurizable chamber 420 to a predetermined pressure, then pressurized fluid can be removed from the first pressurizable chamber 420 while higher pressure pressurized hydraulic fluid remains in the second pressurizable chamber 421.

In another embodiment, pressurized fluid may be provided to the second pressurizable chamber 421 directly through a fluid channel 60. That fluid channel 61 may be separate from the fluid channel 60 that supplies the first pressurizable chamber 420.

FIG. 6 illustrates an end view of the telescoping hydraulic cylinder 400 depicted in FIG. 5. In the embodiment illustrated in FIG. 6, the second end 434 of the barrel 451, the lip 310 of the first gland 486, the second end 438 of the first stage piston 410, the lip 310 of the second gland 487, and the second end 442 of the second stage piston 412 may be seen. Heads of bolts 318 may be seen extending through the first and second glands 486, 487.

Figure 7:
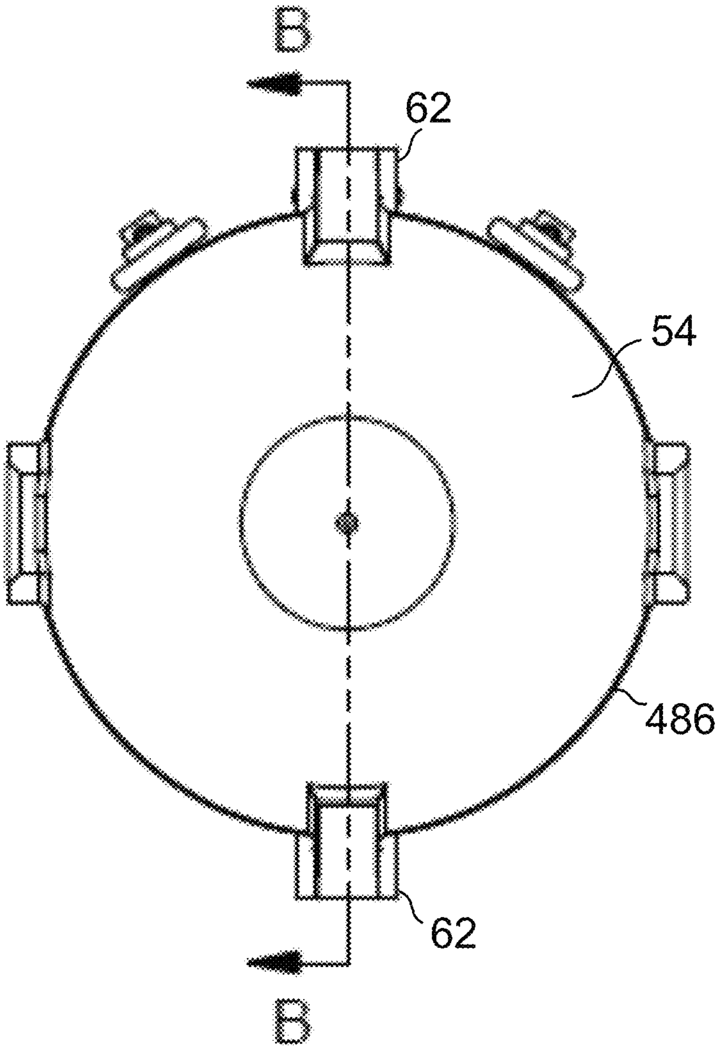
FIG. 7 illustrates a first end view of the hydraulic cylinder depicted in FIGS. 5 and 6 and shows the section along which the hydraulic cylinder of FIG. 6 is sectioned.

FIG. 7 illustrates a sectional side view of an end of the telescoping hydraulic cylinder 400 depicted in FIGS. 5 and 6 cut along a central plane. That view depicts the second end 434 of the barrel 451, the first gland 486, including the lip 310 of the first gland 486, the second end 438 of the first stage piston 410, the second gland 487, including the lip 310 of the second gland 487, and the second end 442 of the second stage piston 412. Bolts 318 may be seen extending through the first gland 486 lip 310 into the second end 434 of the cylinder barrel 451 and bolts 318 may also be seen extending through the second gland 487 lip 310 into the second end 438 of the first piston stage 410.

Figure 8:
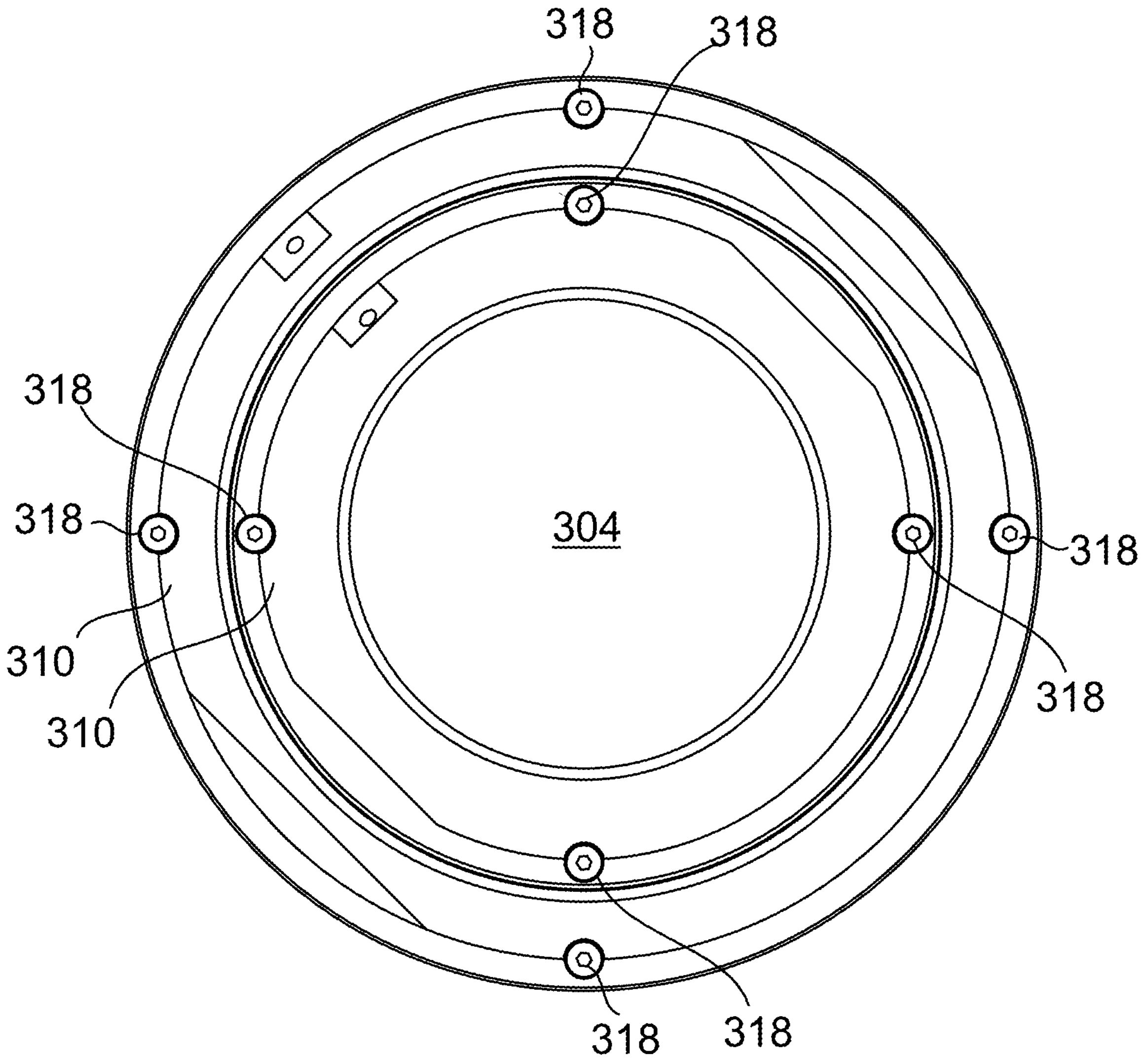
FIG. 8 illustrates another end view of an embodiment of the telescoping hydraulic cylinder.

FIG. 8 illustrates another end view of an embodiment of the telescoping hydraulic cylinder 400 in which the lips 310 of and bolts 319 associated with first and second glands 300 are clearly illustrated.

Figure 9:
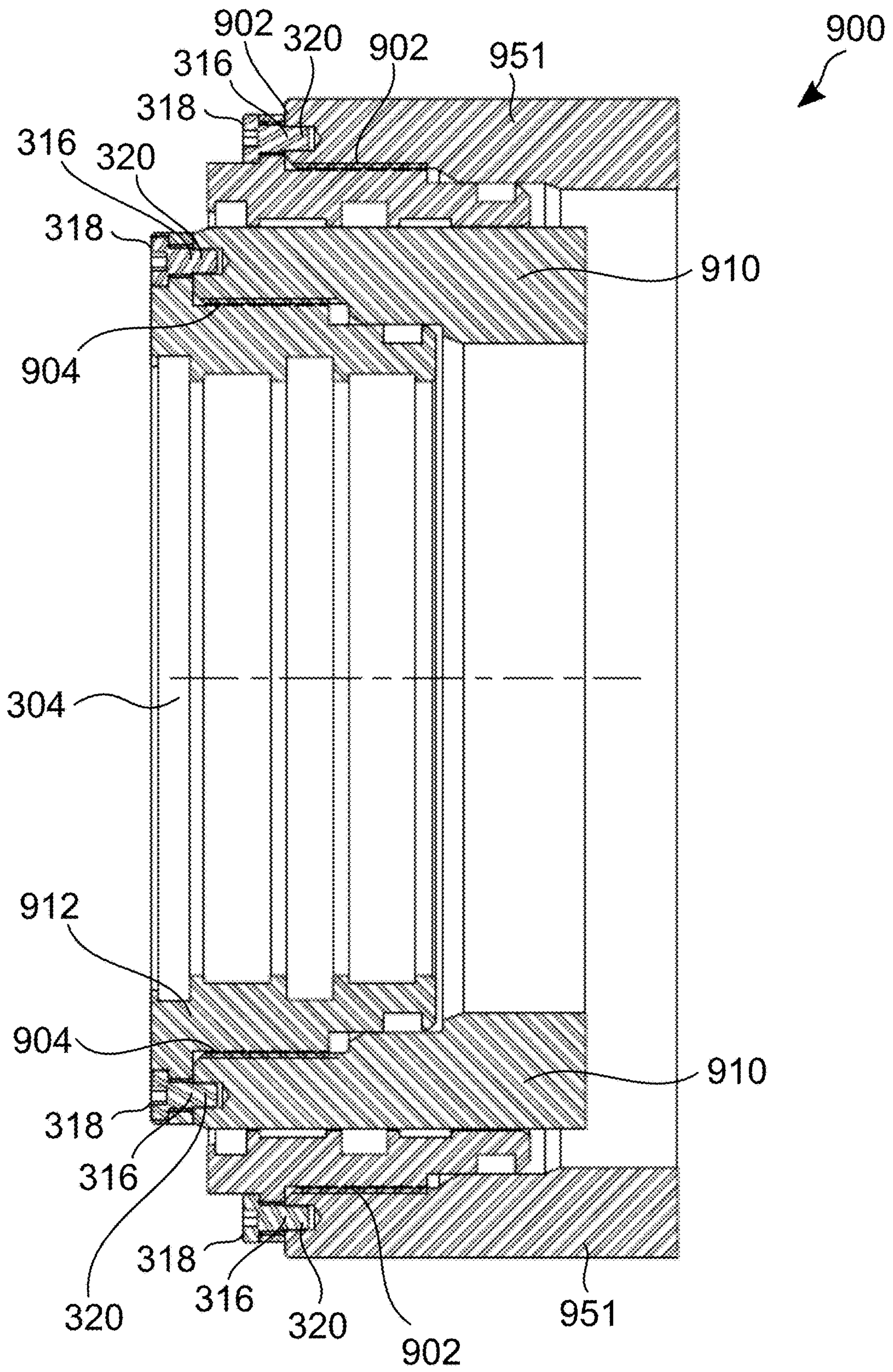
FIG. 9 illustrates a section of an end of an embodiment of a two-stage fluid powered cylinder.

FIG. 9 illustrates a section of an end 900 of an embodiment of a two-stage fluid powered cylinder 50. That embodiment depicts a cylinder barrel 951, a barrel gland 902 threaded into the cylinder barrel 951, a first piston 910, placed through the barrel gland 902, a first piston gland 904 threaded into the first piston 910 and a second piston placed through the first piston gland 910. FIG. 9 further illustrates bolts 318 placed through bolt holes 316 in the barrel gland 902 and the first piston gland 904 into bolt holes 320 in the cylinder barrel 451 and the first piston 910.

Figure 10:
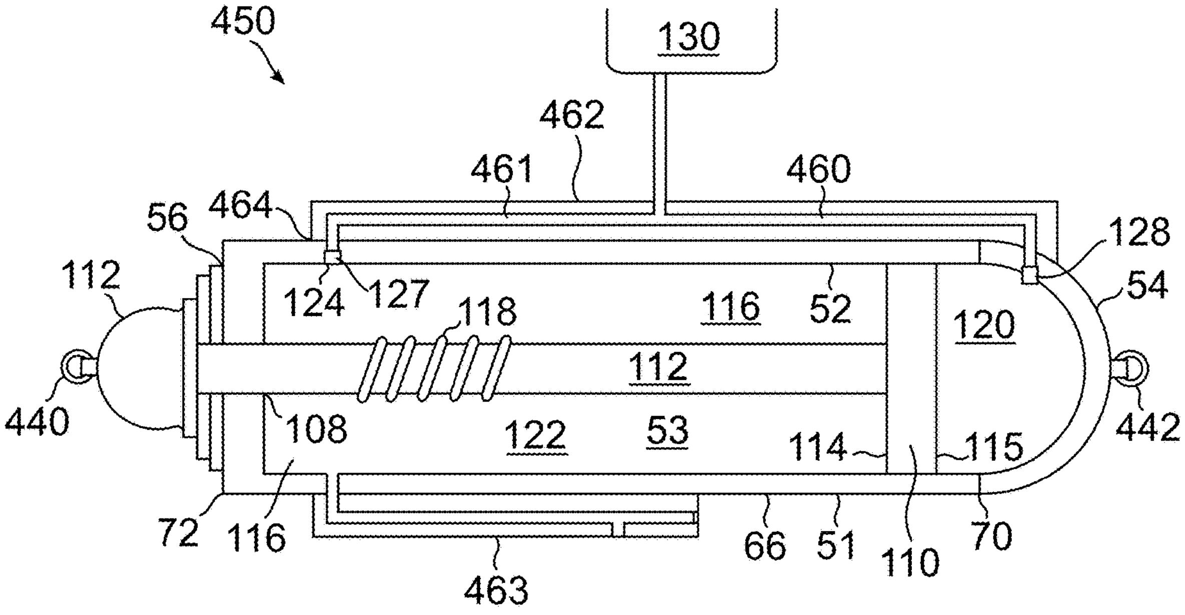
FIG. 10 illustrates a sectional side view of one embodiment of another hydraulic cylinder of the present invention.

FIG. 10 illustrates a fluid driven cylinder 50 that includes a first pressurizable chamber 120, a piston 110, and a piston rod 112. The piston 110 may extend across the fluid driven cylinder barrel 51 bore 116 and separate the first pressurizable chamber 120 in the fluid driven cylinder barrel 51 from a second chamber 122 in the fluid driven cylinder barrel 51. The piston rod 112 may be attached to the piston 110 on a first side 114 of the piston 110 and extend through the second chamber 122, through the base 56, possibly through a seal 116 or a gland 86 and extend external to the fluid driven cylinder 50. The piston rod 112 may furthermore be attached near a central location on the first side 114 of the piston 110. The piston rod 112 may be formed of chrome plated cold rolled steel or another material to meet operating conditions.

The fluid driven cylinder barrel 51, end cap 54, and base 56 may be formed of aluminum, stainless steel, steel, steel alloys, copper, various plastics, or another desired material.

The fluid driven cylinder barrel 51 may be formed by cold drawing seamless tubes through one or more dies, extrusion, wrapping and welding or otherwise connecting sheet goods or metal, molding, or otherwise as desired. The hydraulic cylinder barrel 50 may be honed on its inner surface 52 to create a precisely dimensioned, smooth inner surface 52. A cylinder head or end cap 54 may be used to close a first end 70 of the fluid driven cylinder barrel 51. A base or gland 56 may be used to close a second end 72 of the fluid driven cylinder barrel 51.

Referring to the hydraulic cylinder 50 illustrated in FIG. 4, fluid powered cylinders 50 may be single-acting, wherein pressurized fluid is applied to and removed from the first pressurizable chamber 120 on a second side 115 of the piston 110 or the fluid powered cylinder 50 may be double-acting, wherein pressurized fluid may be applied to and removed from the first pressurizable chamber 120 and also to the second chamber 122, which may cause the second chamber to be pressurizable.

A spring 118 or other biasing element may be included in the second chamber 122 to bias the piston toward the first pressurizable chamber 120 when pressure is reduced in or removed from the first pressurizable chamber 120, primarily in a single acting fluid powered cylinder 50.

A flow control device 127 may be included for each pressurizable chamber 120, 122. Where the second chamber 122 is not pressurizable, no flow control device 127 may be provided for that chamber 122. The flow control device 127 is in fluid communication with one of the pressurizable chambers 120, 122 and the fluid channel 60 to allow fluid to flow into and possibly out of the respective pressurizable chambers 120, 122. The flow control device 127 may be located adjacent to an inlet port 124, 126 extending through the fluid driven cylinder 50 into one of the pressurizable chambers 120, 122.

Flow control devices 127 may include orifices, regulators, bypass regulators, demand-compensated flow controls, pressure-compensated flow valves, valves, check valve, and other desired flow control devices 127.

In certain embodiments, particularly embodiments where the fluid powered cylinder 6, 50, 400 is to remain in an extended position for a significant period of time, such as for example weeks or a month between maintenance being performed on a longwall mine, the flow control device 127 may be manually operated and pressurized fluid may be allowed to flow into the hydraulic cylinder 6, 50, 400 by a human operating a flow control valve or other flow control device until the hydraulic cylinder 6, 50, 400 is extended an appropriate amount, such as until a longwall shield 1 canopy 8 is properly positioned against the roof of the mine. When the hydraulic cylinder 6, 50, 400 is properly positioned, the flow control valve or other flow control device 127 may be closed to maintain the hydraulic cylinder 6, 50, 400 in the chosen position.

The embodiment of a hydraulic cylinder 400 illustrated in FIGS. 6, 7, and 8 may be used in an application where the hydraulic cylinder 400 is to be extended, for example to support a roof of a longwall mine, and is not regularly retracted to its retracted position. In other embodiments, the hydraulic cylinder 6, 50 may be regularly actuated to an extended position and a retracted position or degrees of extended and retracted. In regularly actuated embodiments of fluid driven cylinders 50, a biasing device may be applied to one side 114, 115 of the piston 110 or a double-acting cylinder may be used in which pressurized fluid may be applied to both sides of the piston 100 to actuate or move the piston 100 to different positions within the cylinder barrel 451. In such embodiments, the first pressurizable chamber 120 may be located in the fluid driven cylinder barrel 51 bore 116 on the second side 115 of the piston 110, the side of the piston 110 that is not attached to the piston rod 112. When positive pressure is provided in the first pressurizable chamber 120, the pressure may urge the piston 110 to move in the cylinder 100 bore 116 and cause the piston rod 112 to extend out of the fluid driven cylinder barrel 51 further than when pressure is not applied to the first pressurizable chamber 120.

The cylinder 100 may also include a second pressurizable chamber 122, which may be pressurized positively or may be negatively pressurized with a vacuum. The second pressurizable chamber 122 may be adjacent to the side of the piston 114 that is attached to the piston rod 112. The second pressurizable chamber 122 may be pressurized to maintain the position of the piston 110 in the cylinder 100 bore 116, to move the piston 110 through at least a portion of the cylinder 100 bore 116, or to act on the piston 110 in any desired way. The second pressurizable chamber 122 may also be filled with pressurized fluid, such as air or water-soluble hydraulic fluid, for example, to maintain the piston 110 in or near a desired position in the cylinder 100 bore 116.

The cylinder 50 in the embodiment illustrated in FIG. 4 includes a first inlet port 124 passing from the extended bar 62 through the cylinder 50 into the first pressurizable chamber 120 and in fluid communication with the first pressurizable chamber 120. The cylinder also includes a second inlet port 126 passing through the cylinder 50 into the second pressurizable chamber 122 and in fluid communication with the second pressurizable chamber 122. A first pressurized fluid source 130, such as a first accumulator, may be connected to the first inlet port 124 and a second pressure source 132, such as a second accumulator, may be connected to the second inlet port 126.

It should be recognized that the second inlet port 126 may not be included in certain embodiments, including certain embodiments wherein the second chamber 122 is not pressurized, for example in a single-acting cylinder 50 embodiment wherein the piston 110 is biased toward the first pressurizable chamber 120 by a spring 118, a predetermined pre-established fluid pressure, or other biasing apparatus or method.

In the embodiment illustrated, a flow control valve 126 controls flow of fluid into or out of the first pressurizable chamber 120. The fluid channel 60 is in fluid communication with a hydraulic fluid reservoir 131 at a first end 132 and is extended through the fluid driven cylinder 50 inlet port 124, 126 at a second end 134.

In an embodiment of the fluid driven cylinder 50, the cylinder barrel 51 has a continuous axial inner surface 52 forming an inner chamber 53 or bore 116 having a cross-section, a first end 70, and a second end 72. The end cap 54 covers the first end 70 of the hydraulic cylinder barrel 51 such that no appreciable amount of fluid can pass through the first end 70 of the hydraulic cylinder barrel 51. A base 56 covers the second end 72 of the hydraulic cylinder barrel 51 such that no appreciable amount of fluid can pass through the second 5 end 72 of the hydraulic cylinder barrel 51. The base 56 has a rod opening 108 through which a piston rod 112 extends.

A piston 110 is disposed in and extends across the cross-section of the inner chamber 53 or bore 116 of the hydraulic cylinder barrel 51, the piston 110 having a first side 114 facing the first end 132 of the hydraulic cylinder barrel 51 and a second side 115 facing the second end 134 of the hydraulic cylinder barrel 51. The first side 114 of the piston 110 in the embodiment illustrated is flat, substantially perpendicular to the first end 132 of the hydraulic cylinder barrel 51, and substantially parallel to the end cap 54. The second side 115 of the piston 110 in the embodiment illustrated is flat and substantially perpendicular to the second end 134 of the cylinder barrel 51 and substantially parallel to the base 56.

The cylinder barrel 51 also has a first fluid chamber 120 defined by the second side 115 of the piston 110, a first portion of the inner surface 52 of the cylinder barrel 51, and the end cap 54 and a second chamber 22 defined by the first side 114 of the piston 110, a second portion of the inner surface 52 of the cylinder barrel 51, and the base 56.

A piston rod 112 may be attached to the first side 114 of the piston 110 or the piston may incorporate the piston rod 112. The piston rod 112 extends coaxially through the second chamber 122 of the hydraulic cylinder barrel 51 and through the rod opening 108 in the base 56 in certain embodiments. A base 56 is not necessary in certain embodiments, such as the embodiments illustrated in FIGS. 6, 7, and 8.

The cylinder 50 illustrated in FIG. 4 includes a hydraulic fluid flow control valve attached to a first end of a hydraulic fluid channel 460 and adjacent to a penetration into the first pressurizable chamber 120 of the cylinder 50. That hydraulic fluid flow control valve 128 controls or meters hydraulic fluid that flows from the hydraulic fluid channel 460 to the first pressurizable chamber 120. That hydraulic fluid flow control valve 128 may also control or meter hydraulic fluid flowing out of the first pressurizable chamber 120.

In one embodiment, one or more ports, such as retract port 448 or first valves 452 permit fluid under pressure to enter the first pressurizable chamber 120, 420 from the pressurized fluid source 130. In certain embodiments, one or more fluid relief valves 129 relieve pressurized from the first pressurizable chamber 120, 420. One or more valves, such as check valve 449 may control fluid flow through the cylinder barrel 451 or a piston 410, 420 or between pressurized fluid chambers 120, 410, 122, 422. One such embodiment is illustrated in FIG. 6.

The cylinder 50 illustrated in FIG. 4 includes a seal 116 attached to the base 56 adjacent to where the piston rod 112 extends through the base 56. The cylinder 50 illustrated in FIG. 4 also includes a rod clevis 440 attached to a second end 415 of the piston rod 112 that extends out of the hydraulic cylinder barrel 51 through the base 56 and a cylinder clevis 442 attached to the end cap 54 and extending away from the cylinder barrel 51 and the first pressurizable chamber 120. One of the clevises 440, 442 may be attached to a fixed or stationary point, such as a grounding strut, a base, or the chassis of a mechanism and the other clevis 440, 442 may be attached to an arm or other apparatus to be moved by the cylinder 50.

The cylinder 50 illustrated in FIG. 4 may operate as a double-acting cylinder that uses pressurized fluid applied to the first pressurizable chamber 120 to extend the piston rod 112 further out from the cylinder barrel 51 and uses pressurized fluid applied to the second pressurizable chamber 122 to retract the piston rod 112 into the cylinder barrel 51.

Figure 11:
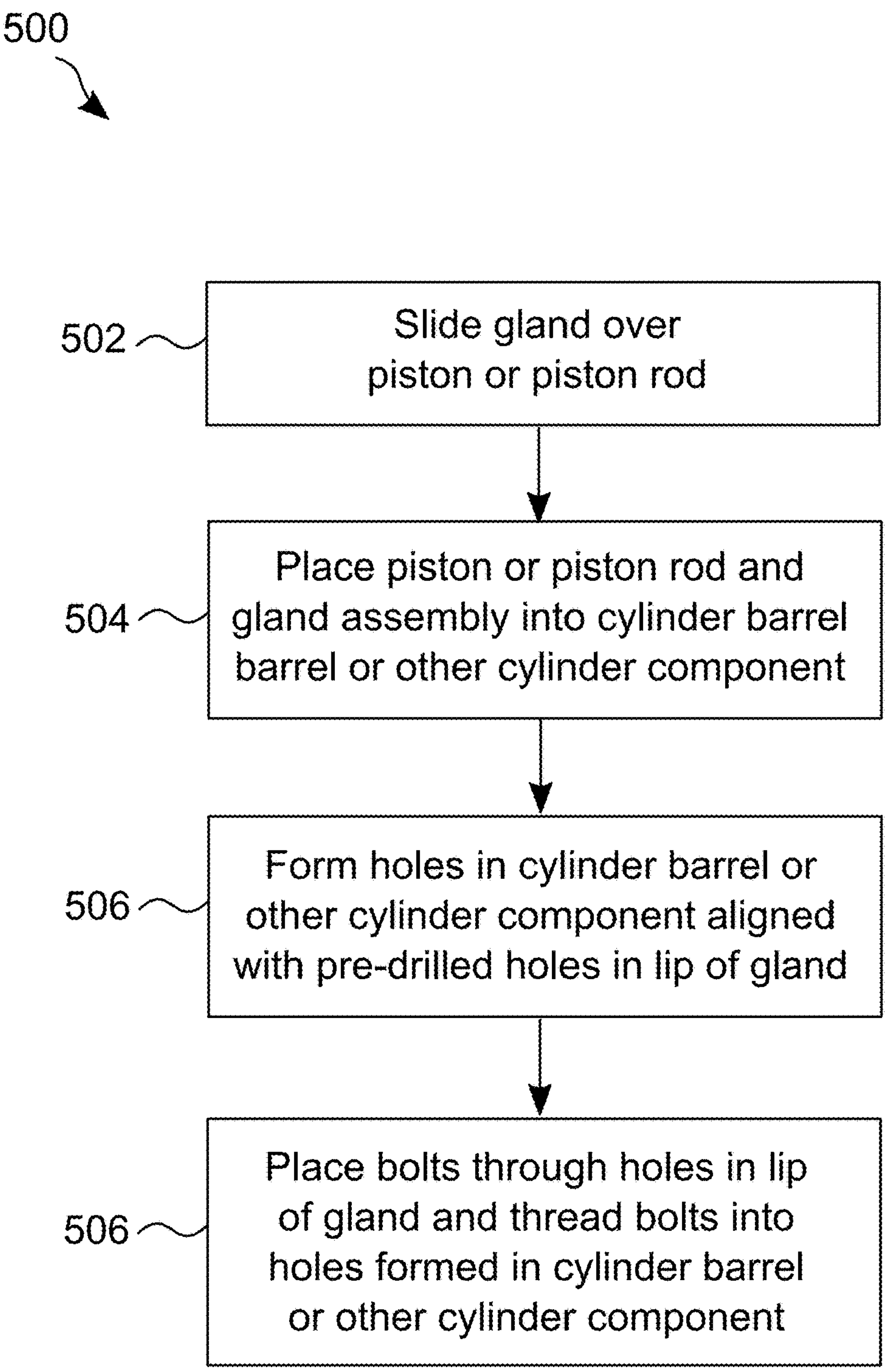
FIG. 11 illustrates a flow chart of a method of installing a gland in a component of a pressurized fluid cylinder.

FIG. 11 is a flow chart of a method 500 of installing a gland in a component 410, 412, 451 of a pressurized fluid cylinder. The method 500 may be used with one or more embodiments and various components illustrated in and discussed in connection with FIGS. 1-10. That method 00 may furthermore be used in each of the multiple stages in connection with each cylinder in a multi-cylinder fluid driven cylinder 50, 400, 450. Elements of those apparatuses e.g., 1, 300, and 50, discussed in connection with those Figures will be referred to in this method 500.

The method 500 may include, at 502, the gland 300 may be slid over a piston 110, 410, 412 or piston rod 112. At 504, the piston 110, 410, 412 or piston rod 112 and gland 300 assembly may be placed into the cylinder barrel 51 or other cylinder component 451, 410. At 506, holes may be formed in the cylinder barrel 51 or other cylinder component 451, 410 aligned with pre-drilled gland holes 316 in the lip 310 of the gland 300 and at 508 one or more bolts 318 may be placed through the holes 316 in the lip 310 of the gland 300 and threaded into the holes formed in the cylinder barrel 51 or other cylinder component 451, 410.

An alternative method of a method 500 of installing a gland in a component 410, 412, 451 of a pressurized fluid cylinder includes; threading a body 302 of a gland 300 into a fluid driven cylinder component 51, 451, 410. Placing bolts 318 through a lip 310 of the gland 300 and threading the bolts into an end 432, 434 of the apparatus into which the gland 300 has been threaded, the cylinder barrel 451 or first stage piston 410, for example. A piston 110, 410, 412 may then be placed through an orifice 304 in the gland 300, the piston 10, 410, 412 sliding against an internal surface of a wall 304 formed in the gland 300.

While specific embodiments of the invention have been described in detail, it should be appreciated by those skilled in the art that various modifications and alternations and applications could be developed in light of the overall teachings of the disclosure. Accordingly, the particular arrangements, apparatuses, and methods disclosed are meant to be illustrative only and not limiting as to the scope of the invention.

What is claimed is:

1. A hydraulic cylinder having a secured sealing gland, comprising:

- a hydraulic cylinder barrel having a first end, a second end, a cross-section, an outer surface, and an axial inner surface, the axial inner surface threaded with square threads at the second end;
- a barrel sealing gland having an axial body with an outer surface, a lip that extends axially out from the body, and an orifice extending axially through the axial body of the barrel sealing gland forming an inner surface of the barrel sealing gland, the barrel sealing gland having square threads on the outer surface of the barrel sealing gland body, the barrel sealing gland threaded into the square threads of the hydraulic cylinder barrel with the barrel sealing gland square threads; a plurality of lip retaining bolts extending through the barrel sealing gland lip and threaded into the hydraulic cylinder barrel;
- a first piston disposed through the barrel sealing gland axial orifice and extending into the hydraulic cylinder barrel, the first piston having a first end, a second end, an outer surface, an axial hole extending therethrough, and a first piston axial inner surface, and forming a first pressurizable chamber defined by the axial inner surface of the hydraulic cylinder barrel and the first piston extending through the barrel sealing gland into the hydraulic cylinder barrel, the first piston axial inner surface threaded with square threads at the second end;
- a first piston sealing gland having an axial body with an outer surface, a lip that extends axially out from the body, and an orifice extending axially through the first piston sealing gland forming an inner surface of the first piston sealing gland, the first piston sealing gland having square threads on the outer surface of the first piston sealing gland, the first piston sealing gland threaded into the square threads of the first piston;
- a retract port extending through the hydraulic cylinder barrel in fluid communication with the first pressurizable chamber;
- a second piston disposed through the axial hole extending through the first piston sealing gland and into the first piston forming a second pressurizable chamber defined by the first piston axial inner surface and the second piston extending through the first piston sealing gland into the first piston;
- a relief valve extending through the hydraulic cylinder barrel and in fluid communication with the first pressurizable chamber; and
- a plurality of bolts disposed through the first piston sealing gland and threaded into the first piston.

2. The apparatus of claim 1, further comprising a flow control device attached to the retract port.

3. The apparatus of claim 2, wherein the flow control device is one of an orifice, a regulator, a bypass regulator, a demand-compensated flow control, a pressure-compensated flow valve, and a valve.

4. The apparatus of claim 3, wherein the flow control device is a manually operated valve.

5. The apparatus of claim 2, further comprising a second relief valve that extends through the first stage piston to permit fluid to drain from the second pressurizable chamber.

6. The apparatus of claim 2, wherein the retract port is in fluid communication with a pressurized hydraulic fluid source.

7. The apparatus of claim 6, further comprising a flow control device attached to the retract port.

8. The apparatus of claim 7, wherein the flow control device attached to the retract valve is manually operated.

9. The apparatus of claim 1, wherein the relief valve permits fluid to drain out of the first pressurizable chamber.

10. The apparatus of claim 1, further comprising a check valve in the first piston in fluid communication with the first pressurizable chamber and the second pressurizable chamber.

11. The apparatus of claim 1, further comprising a plurality of holes pre-threaded into the hydraulic cylinder barrel to receive the plurality of lip retaining bolts in the barrel sealing gland.

12. The apparatus of claim 11, wherein the plurality of pre-threaded holes in the hydraulic cylinder barrel is greater than a number of preformed holes in the barrel sealing gland lip so that the barrel sealing gland lip may be positioned in a variety of positions axially as the barrel sealing gland is threaded into the hydraulic cylinder barrel.

13. The apparatus of claim 12, further comprising a plurality of holes pre-threaded into the first piston to receive the plurality of lip retaining bolts in the first piston sealing gland.

14. The apparatus of claim 13, wherein the plurality of pre-threaded holes in the hydraulic cylinder is greater than a number of preformed holes in the first piston sealing gland lip so that the first piston sealing gland lip may be positioned in a variety of positions axially as the first piston sealing gland is threaded into the first piston.

15. A longwall mining shield, comprising:

- two parallel pontoons;
- two hydraulic cylinders, each having a barrel and a piston, a first end of each hydraulic cylinder barrel attached to one of the two parallel pontoons; and
  - a canopy attached to a second end of the two hydraulic cylinder pistons;
- each hydraulic cylinder barrel having a first end, a second end, a cross-section, an outer surface, and an axial inner surface, the axial inner surface forming an inner chamber, and a threaded axial inner surface at the second end;
- the hydraulic cylinders each further comprising:
  - a barrel sealing gland having an axial body with an outer surface, a lip that extends axially out from the body, and an orifice extending axially through the center of the axial body of the barrel sealing gland forming an inner surface of the barrel sealing gland, the barrel sealing gland having threads on the outer surface of the barrel sealing gland body, the barrel sealing gland threaded into the threads of the hydraulic cylinder barrel with the barrel sealing gland threads;
  - a plurality of bolts extending through the barrel sealing gland lip and threaded into the hydraulic cylinder barrel;
  - a first piston disposed through the barrel sealing gland axial orifice and extending into the hydraulic cylinder barrel, the first piston having a first end, a second end, an outer surface, and an axial inner surface, and forming a first pressurizable chamber defined by the inner surface of the hydraulic cylinder barrel and the first piston extending through the barrel sealing gland into the hydraulic cylinder barrel; and a retract port extending through the hydraulic cylinder barrel for fluid communication with a pressurized fluid source.

16. The apparatus of claim 15, further comprising:

a first piston sealing gland having an axial body with an outer surface, a lip that extends axially out from the body, and an orifice extending axially through the center of the first piston sealing gland forming an inner surface of the first piston sealing gland, the first piston sealing gland having threads on the outer surface of the first piston sealing gland, the first piston having an axial inner surface, the axial inner surface threaded with threads at the second end, the first piston sealing gland threaded into the threads of the first piston;

a second piston disposed through the axial hole extending through the first piston sealing gland and into the first piston forming a second pressurizable chamber defined by the axial inner surface of the first piston and the second piston extending through the first piston sealing gland into the first piston;

a plurality of bolts disposed through the first piston sealing gland and threaded into the first piston;

a check valve in the first piston in fluid communication with the first pressurizable chamber and the second pressurizable chamber; and a relief valve extending through the hydraulic cylinder barrel and in fluid communication with the first pressurizable chamber.

17. A method of assembling a hydraulic cylinder, comprising:

screwing a square-threaded outer surface of a gland into a square-threaded inner surface of a hydraulic cylinder barrel;

bolting an end of the gland to an end of the hydraulic cylinder barrel; and sliding a first piston through the gland such that the piston extends into the hydraulic cylinder.

18. The method of assembling a hydraulic cylinder of claim 17, further comprising:

screwing a square-threaded outer surface of a first piston gland into a square-threaded inner surface of the first piston;

bolting an end of the first piston gland to an end of the first piston; and sliding a second piston through the first piston gland such that the second piston extends into the first piston.

19. The method of assembling a hydraulic cylinder of claim 17, further comprising forming a plurality of pre-threaded holes in the hydraulic cylinder barrel to receive a plurality of lip retaining bolts disposed through the barrel sealing gland.

20. The method of assembling a hydraulic cylinder of claim 19, wherein the plurality of pre-threaded holes formed in the hydraulic cylinder barrel is greater than a number of preformed holes in the barrel sealing gland lip so that the barrel sealing gland lip may be positioned in a variety of positions axially as the barrel sealing gland is threaded into the hydraulic cylinder barrel.

* * * * *